(12) United States Patent
Sugaya

(10) Patent No.: US 6,324,667 B1
(45) Date of Patent: Nov. 27, 2001

(54) RADIO TRANSMISSION METHOD AND RADIO TRANSMISSION DEVICE

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/232,630

(22) Filed: Jan. 19, 1999

(30) Foreign Application Priority Data

Jan. 23, 1998 (JP) ................................... 10-011853

(51) Int. Cl.[7] ................................................ G06F 11/00
(52) U.S. Cl. ................................. 714/746; 714/751
(58) Field of Search ................................ 714/758, 746, 714/752, 751

(56) References Cited

U.S. PATENT DOCUMENTS

| | | | | |
|---|---|---|---|---|
| 5,345,594 | * | 9/1994 | Tsuda | 455/18 |
| 5,430,738 | * | 7/1995 | Tsuda | 714/752 |
| 5,638,384 | * | 6/1997 | Hayashi et al. | 714/752 |
| 5,646,941 | * | 7/1997 | Nishimura et al. | 370/389 |

* cited by examiner

Primary Examiner—Phung M. Chung
(74) Attorney, Agent, or Firm—Jay H. Maioli

(57) ABSTRACT

A transmission process of control data is carried out simply and the reliability of transmission of the control data is improved. Data transmission among a plurality of communication stations is performed with a predetermined packet arrangement and transmission of the control data from a control station or a communication station is performed with the same predetermined packet arrangement.

5 Claims, 9 Drawing Sheets

RADIO TRANSMISSION METHOD AND RADIO TRANSMISSION DEVICE

BACKGROUND OF THE INVENTION

1. Field of the Invention

The present invention relates to a radio transmission method and a radio transmission device suitable for being applied to a case of transmitting various kinds of information by, for example, a radio signal for making up a local area network (LAN) among a plurality of appliances.

2. Description of the Related Art

In the past, when a local area network is set up among a plurality of video appliances, a personal computer device and its peripherals in a narrow range such as in a home, in an office and the like to make it possible to transmit data which are dealt with by those appliances, there is a case where data transmission can be carried out by radio transmission by connecting a radio signal transmitting/receiving device to each appliance instead of directly connecting respective appliances with a signal cable or something.

By making up the local area network with the radio transmission, there is no need for directly connecting among respective appliances with signal cables, thereby making it possible to simplify a system arrangement.

By the way, in a case where a local area network area is made up by using more than three units of radio devices, it has such an arrangement in which one unit of radio devices is designated as a control station and according to an indication by control data transmitted from the control station, a transmission path is secured for carrying out data transmission among respective appliances.

Here, a control channel, a control slot for transmitting control data and the like have such an arrangement prescribed by a radio transmission format and are made up such that generally the control data and other data are strictly discriminated when they are transmitted, and there has been a need that a receiving process of the control data and a receiving process of general transmission data are carried out by different processes.

Also, because the control data is data for securing the transmission path, there is a need that the control data is surely transmitted to respective appliances, but actually, the control data are made to be transmitted under the same condition as that of the other transmission data. As a result, a transmission system needs to be set up so as to transmit all of the transmission data including the control data on a transmitting path with a high quality. However, with respect to the transmission data except the control data, there is a case where a transmission error of, for example, video data, audio data and the like are negligible, but in a case of a transmission error of the control data, it is undesirable. Therefore, even in the case of transmitting the video data, the audio data and the like, there previously was a need for setting a transmission path in accordance with the transmission condition of the control data.

SUMMARY OF THE INVENTION

In view of the above point, an object of the present invention is to simply carry out the transmission process of the control data.

Also, another object of the present invention is to improve the reliability of the transmission of the control data.

According to first aspect of the present invention, there is provided a data transmission method in which data transmission among a plurality of communication stations is carried out as data with a predetermined packet arrangement and the transmission of the control data from a control station for carrying out an access control is also made to be carried out by the same predetermined packet arrangement.

According to the first data transmission method of the present invention, the control data and the other data are transmitted with a common packet arrangement so that a reception process of the control data and the other data can be made common on a reception side.

According to a second aspect of the invention, there is provided a data transmission method in which an error detecting code or an error correcting code is added to data to be transmitted among a plurality of communication stations before transmitting the data as well as an error detecting code or an error correcting code is independently added to the control data, which carries out the access control, before transmitting the control data.

According to the second data transmission method of the present invention, it becomes possible to stringently add the error detecting code or the error correcting code to the control data than to the other data.

According to a third aspect of the present invention, there is provided a data transmission method in which data to be transmitted among a plurality of the communication stations are transmitted as data which is made a predetermined packet arrangement and the transmission of the control data from the control station, which carries out the access control, is repeatedly carried out a plurality of times as the packet arrangement.

According to the third data transmission method of the present invention, it is possible to raise a possibility that the control data can be correctly received on the reception side due to repeated transmission of the control data.

According to a fourth aspect of the present invention, there is provided a data transmission method in which when the control data is detected by carrying out a decoding process of data in a header portion of a signal received by the communication station, a control process of a communication based on the control data is carried out and when it is detected that data other than the control data is transmitted, the decoding process of data which is transmitted continuously to the header portion is carried out and when the decoding processing can not be carried out, a resend demand is made to a transmission source station.

According to the fourth data transmission of the present invention, when the control data and the other data are transmitted as the same packet arrangement, each data can be properly processed and at the same time, when there is a case where the decoding of the received data can not be carried out, the data can be made to be transmitted again.

DESCRIPTION OF THE PREFERRED EMBODIMENTS

Hereafter, an embodiment according to the present invention will be explained with reference to the attached drawings.

Figure 1:
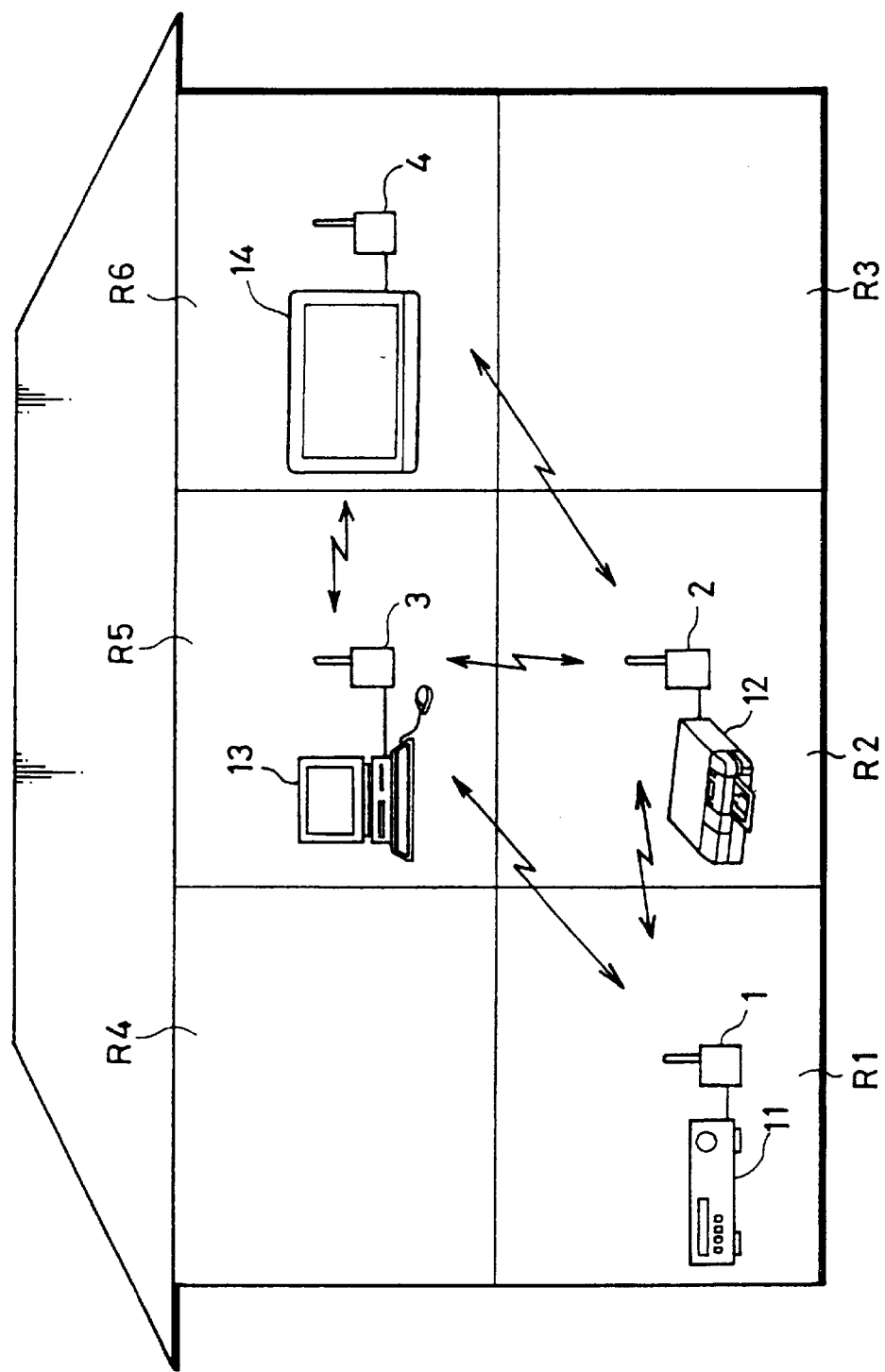
FIG. 1 is an explanatory diagram showing an example of a system arrangement according to an embodiment of the present invention.

In this embodiment, the present invention is applied to a system which carries out transmission and reception of video data, data for a computer and the like in a home and the like. First of all, an outline of a system arrangement of this embodiment will be explained with reference to FIG. 1. For example, as shown in FIG. 1, in a home where a plurality of rooms R1, R2, . . . R6 are provided, suppose that a video deck 11 is installed in the room R1, a video printer 12 in the room R2, a personal computer device 13 in the room R5, and a television receiver 14 in the room R6, respectively. At this time, there is an arrangement such that transmission devices 1,2,3 and 4 are connected to respective devices 11, 12, 13 and 14, and radio transmission of various kinds of data among respective devices among 11, 12, 13 and 14 can be carried out by the connected transmission devices 1, 2, 3 and 4, respectively.

For example, it is conceivable that a video program reproduced from a video tape in the video deck 11 is transmitted to and received by the television receiver 14, is transmitted to the personal computer device 13 to take an arbitrary image therein, and is transmitted to the video printer 12 to print out an arbitrary static image. Also, a video data processed by the personal computer device 13 is transmitted to the video printer 12 to print out the same, is transmitted to the video deck 11 to be recorded in a video tape or the like and is transmitted to and received by the television receiver 14. Also, it is conceivable that a video program as a television broadcast which is being received by a tuner incorporated in the television receiver 14 is transmitted to the video deck 11 to be recorded in a video tape or the like, is transmitted to the personal computer device 13 to take an arbitrary image therein and is transmitted to the video printer 12 to print out an arbitrary image.

Figure 2:
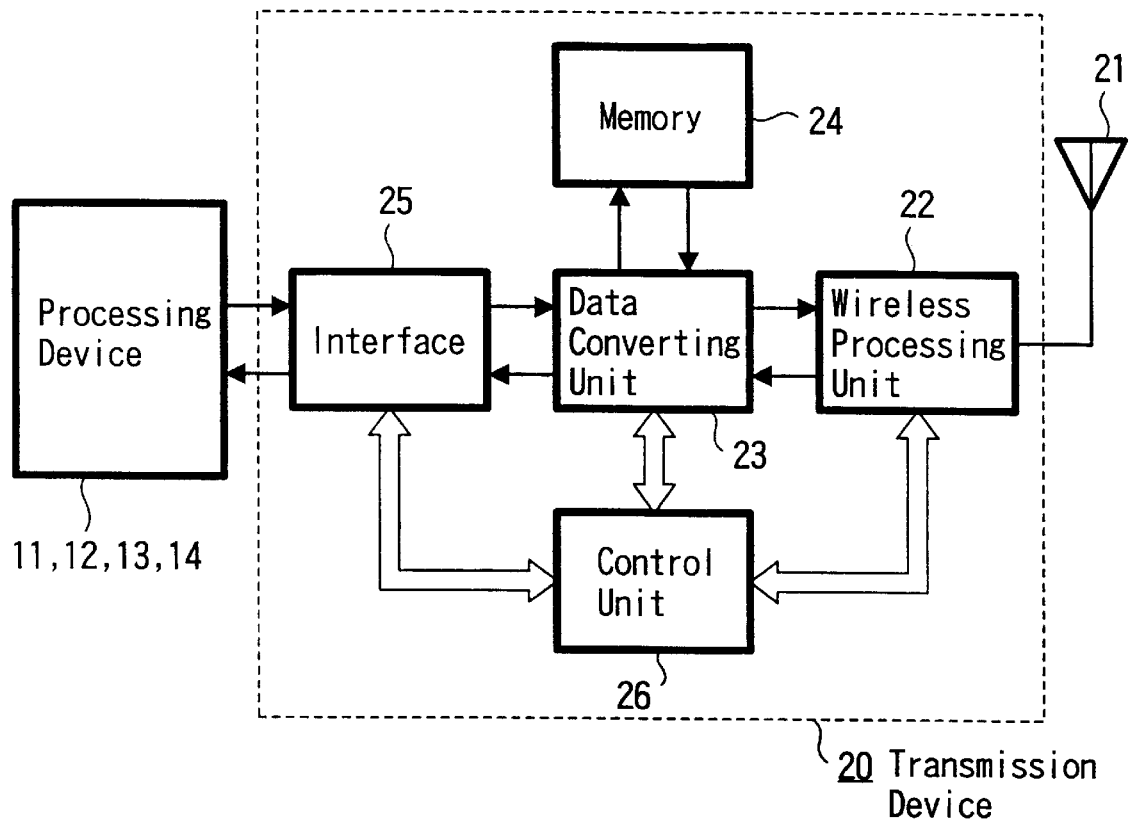
FIG. 2 is a block diagram showing a layer arrangement of a transmission device according to an embodiment of the present invention.

Here, an explanation will be made about arrangements of each of the transmission devices 1~4 which are connected to respective devices 11~14. Here, the transmission devices 1~4 are made to have a common arrangement and a transmission device 20 shown in FIG. 2 shows the whole of a device used as each of the transmission devices 1~4 making up the transmission system. This transmission device 20 is made up by comprising an antenna 21 for carrying out the transmission and the reception, and a radio processing unit 22 connected to the antenna 21 for carrying out a radio transmission process and a radio reception process, thereby making it possible to carry out a radio transmission between the device and the other transmission devices. In this case, as a frequency for transmission and reception by the radio processing unit 22 of this example, for example, a very high frequency band (for example, 5 GHz band) is used and a frequency (channel) for transmission and reception can be set in plural numbers. In this example, as for a transmission output, a relatively weak output is set and for example, when used indoors, an output to the extent of carrying out radio transmission of several meters to several ten meters (concretely, output to the extent of being able to transmit to as far as a neighboring room) is set.

Then, the transmission device 20 is made up such that a data converting unit 23 is provided for carrying out data conversion of a signal received by the radio processing unit 22 and for carrying out data conversion of a signal transmitted from the radio processing unit 22, and the data converted by the data converting unit 23 can be temporarily memorized in a memory 24. This temporary memorization process by the memory 24 is used when a relay of a radio signal is carried out by the transmission device 20, and after the memorized data is read out at predetermined timing, converted again by the data converting unit 23 and supplied to the radio processing unit 22 to carry out radio transmission.

Also, there is an arrangement such that the converted data by the data converting unit 23 is supplied to processing devices (here, the video deck 11, the video printer 12, the personal computer device 13 and the television receiver 14) which are connected thereto through an interface 25 as well as data supplied from the connected processing devices is supplied to the data converting unit 23 through the interface 25 so that the data can be subjected to a conversion process.

There is an arrangement such that respective units in the transmission device 20 carry out processes based on control by a control unit 26 which is made up of a microcomputer and the like. In this case, when a signal received by the radio processing unit 22 is a control signal, the received signal is supplied to the control unit 26 through the data converting unit 23 and the control unit 26 sets the respective units in a state indicated by the received control signal. Also, as for a control signal transmitted from the control unit 26 to other transmission devices, the control unit 26 is made to supply the control signal therefrom to the radio processing unit 22 through the data converting unit 23 to carry out the radio transmission thereof.

Meanwhile, the transmission system of this example assembles the system by preparing a plurality of the transmission devices having the arrangement shown in FIG. 2 and is set such that one transmission device of them functions as a master (control station) for transmitting the control data and the other transmission devices receive the control signal and function as a slave which is set to a state indicated by the master. In this case, the transmission device of the master as the control station is disposed at a position so that in principle it can directly communicate with all the slaves in the system, thereby making up a so-called star-type network.

The transmission system is made up by using an arbitrary number of the above-mentioned transmission devices 20. For example, the transmission device 20 is used as each of the transmission devices 1~4 of the system shown in FIG. 1.

Next, in a case where the transmission system is made up as shown in FIG. 1, a transmission process arrangement in the transmission device will be explained. Here, an example will be explained of video data or the like being transmitted from the video deck 11 connected to the transmission device 1 in the room R1 to the television receiver 14 connected to the transmission device 4 in the room R6.

Figure 3:
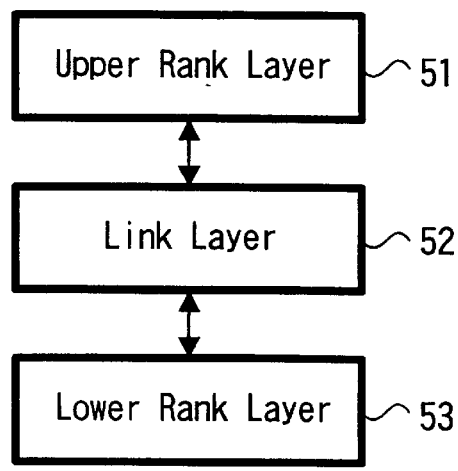
FIG. 3 is a block diagram showing a layer arrangement according to an embodiment of the present invention.

The transmission process arrangement of this example is, as shown in FIG. 3, made up of an upper-rank layer 51, a link layer 52 and a lower-rank layer 53, and an application process necessary for transmission control and a process necessary for transmitting and receiving of data between the appliances connected to the transmission device and the transmission device correspond to the upper-rank-layer 51. A process in which data supplied by control of the upper-rank layer 51 is converted to data with a transmission arrangement as well as received data is converted to data for output by control of the upper-rank-layer 51 corresponds to the link layer 52. A process in which data supplied from the link layer 52 is subjected to a radio transmission process as well as reception processed data is supplied to the link layer 52 corresponds to the lower-rank layer 53, and a process to convert as well as amplify a frequency for transmission and reception is included therein. Here, this example is characterized by the process in the link layer 52.

Figure 4:
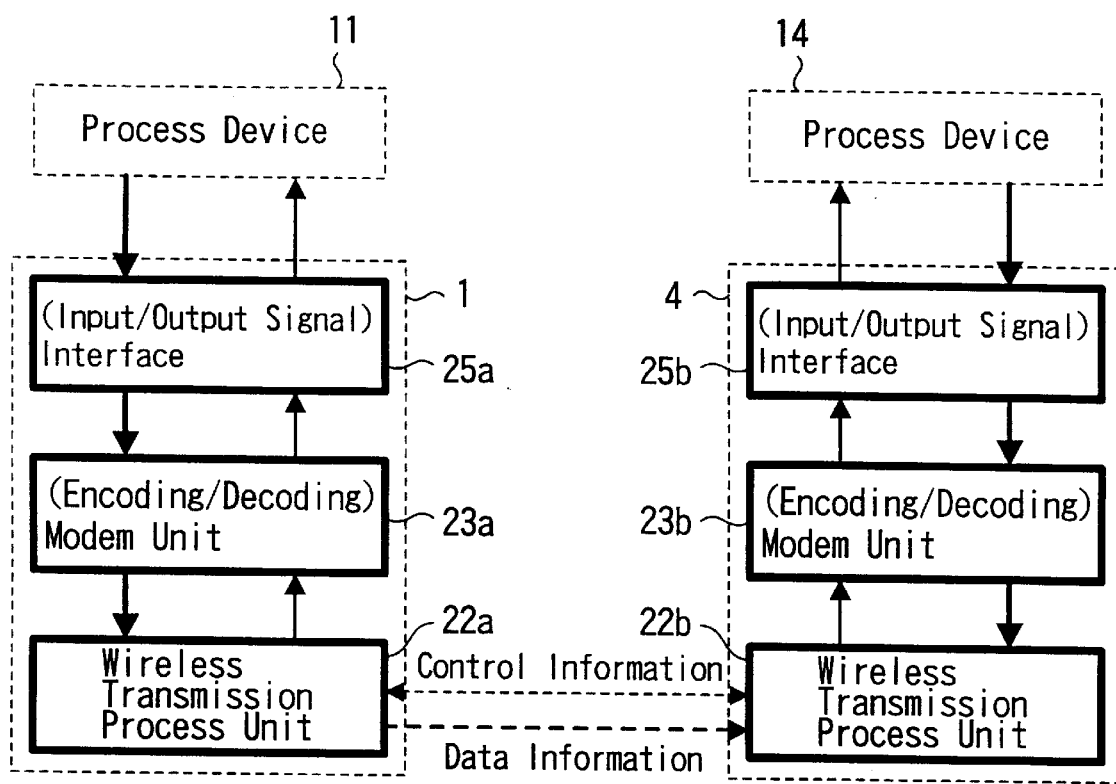
FIG. 4 is a block diagram showing an example of information transmission according to an embodiment of the present invention.

A transmission arrangement from the video deck 11 to the television receiver 14 becomes an arrangement as shown in FIG. 4. Data such as video data and the like output by the video deck 11, which is a process device, is converted by an interface unit 25a of the transmission device 1, then subjected to a coding process by a modem unit 23a corresponding to the data converting unit and transmitted as a radio signal with a predetermined frequency band by a radio signal processing unit 22a.

On the transmission device 4 side, this radio signal is subjected to a reception process by a radio transmission processing unit 22b, subjected to a decoding process by a modem unit 23b corresponding to the data converting unit, converted for output by an interface unit 25b and then supplied to the television receiver 14 as a process device.

Here, although transmission of necessary data such as the video data and the like is carried out between the transmission device 1 and the transmission device 4, control data for setting its transmission path is transmitted from the transmission device of the master which is set to be a control station. Also, there is a case where control data of some kind is transmitted between the transmission device 1 and the transmission device 4. For example. when data transmission is to be started, a head portion of the transmission data is attached with an address of a transmission source and an address of a receiver as control data and then transmitted. Further, when a need arises for relay transmission by another transmission device between the transmission device 1 and the transmission device 4, there is a case where control data related to the relay transmission (for example, data for designating the relaying station) is transmitted.

When an explanation is made as to an arrangement of the transmission data among respective transmission devices, here, there is an arrangement such that the transmission path is set by an Orthogonal Frequency Division Multiplex (so-called OFDM modulation), in which an orthogonal modulation process is carried out to convert a time axis to a frequency axis at a time of transmission with a predetermined unit (for example, one symbol packet) as a unit and on a receiving side, a demodulation process is carried out to convert the frequency axis of a received signal to the time axis. Meanwhile, in the following explanation, information which is actually desired to be transmitted such as video data, audio data and the like will be described as transmission data in order to discriminate it from the control data.

Figure 5:
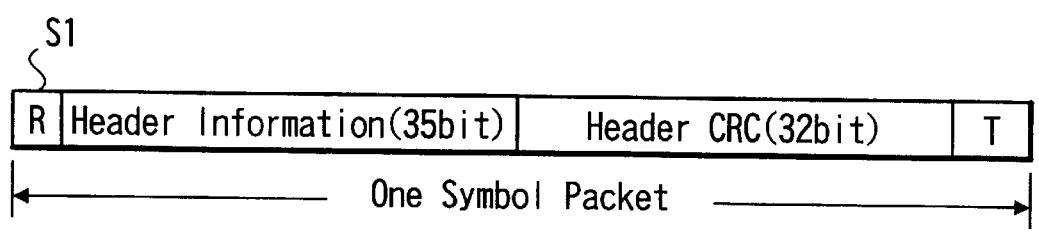
FIG. 5 is an explanatory diagram showing an example of transmission data arrangement (example of one symbol packet) according to an embodiment of the present invention.

The one symbol packet as a first unit at a time of transmitting data has such an arrangement as shown in FIG. 5. The example shown in FIG. 5 shows a packet $S_1$ in a case of transmitting control data and here, one symbol packet has a capacity capable of transmitting 77 bits at the maximum and first, a reference bit R with 4 bits is arranged to be followed by header information with 35 bits indicating control data and following the control data, a header CRC (Cyclic Redundancy Code: hereafter is referred to as CRC) with 32 bits is arranged. Lastly, a tail bit T with 6 bits is arranged. In a case of transmitting only the control data, only a signal of one symbol packet $S_1$ is transmitted.

Figure 6:
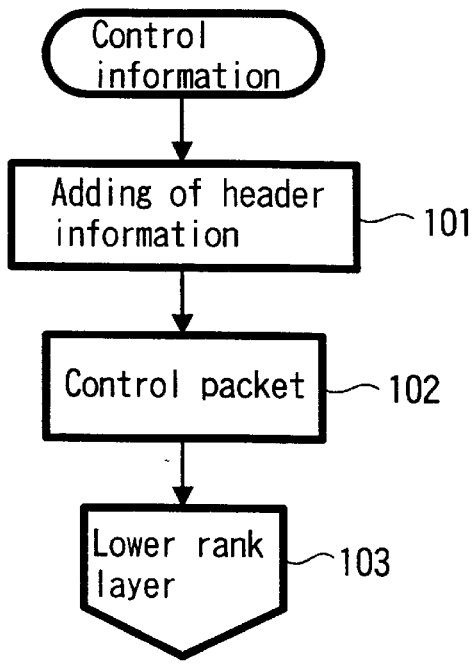
FIG. 6 is a flowchart showing a transmission process in a case of transmitting only header information according to and embodiment of the present invention.

The data having such an arrangement is generated by a process shown in the flowchart of FIG. 6. That is, as a packeting process of control information, a process to add the header information and the header CRC is carried out under the control of the control unit 26 (refer to FIG. 2) in the transmission device (step 101), and after being packeted to the state shown in FIG. 5 (step 102), the control information is supplied to the radio processing unit 22 side, which is a lower rank layer, for transmission (step 103).

Figure 7:
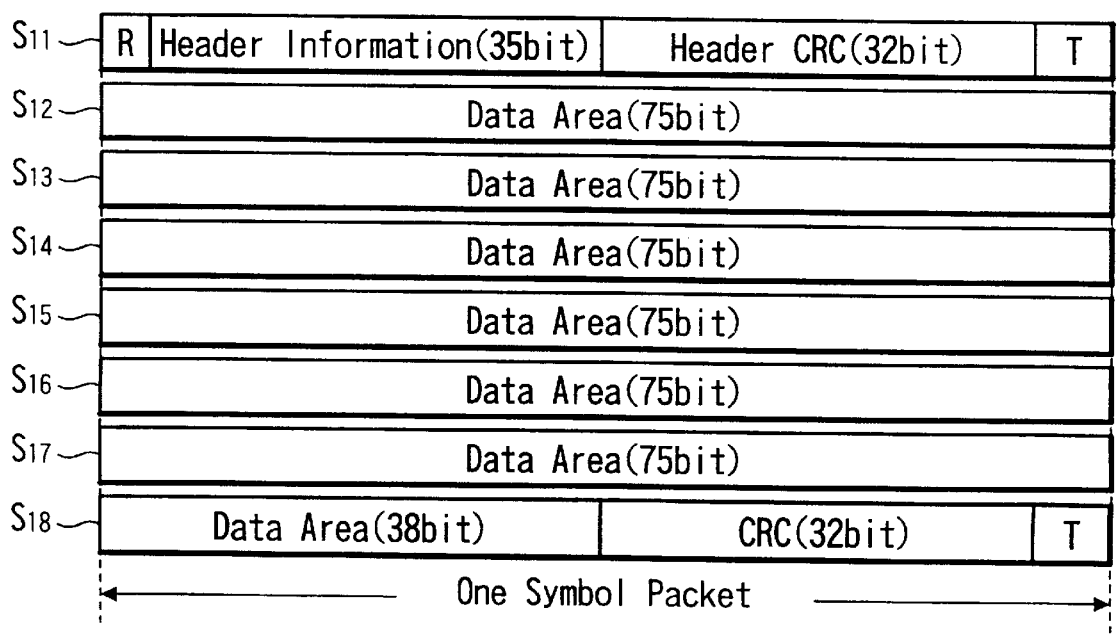
FIG. 7 is an explanatory diagram showing an example of the transmission arrangement (example of 8 symbol packet) according to an embodiment of the present invention.

Next, an example of a case in which the control data is included in the head portion of the transmission data will be shown in FIG. 7. This example shows an example in a case of transmitting 8 symbol packets, in which a reference bit R with 4 bits is arranged at the head portion of a first symbol packet $S_{11}$ to be followed by the header information with 35 bits indicating the control data and following the control data, the header CRC (Cyclic Redundance Code) with 32 bits, which is an error detecting code of the control data, is arranged. Lastly, the tail bit T with 6 bits indicating an end of the control data is arranged. Meanwhile, the control data at the time indicates that there is the transmitted data.

Then, from a second symbol packet$_{12}$ on, as long as the transmitted data succeeds, transmission data with 75 bits is arranged per one symbol packet, and for the last symbol packet $S_{18}$, the transmission data is arranged for first half 38 bits and in succession, a CRC with 32 bits, which is a transmission data error detection code, is arranged and lastly, the tail bit T with 6 bits indicating an end of the transmission data is arranged. Meanwhile, the CRC in the eighth symbol packet $S_{18}$ may be a CRC which is generated by including not only the transmission data after the second symbol packet $S_{12}$ but the data in the first symbol packet $S_{11}$ (header information and the like).

Figure 8:
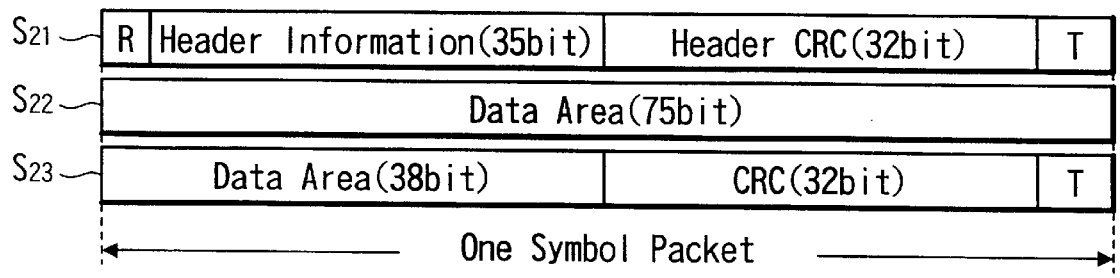
FIG. 8 is an explanatory diagram showing an example of a transmission data arrangement (example of 3 symbol packet) according to an embodiment of the present invention.

Here, an example of the eight symbol packets is shown, but the number of the symbol packets is variable depending on the capacity of the transmission data (however, there is a case where the maximum number of the packets is regulated). For example, as shown in FIG. 8, there is a case where the transmission data is composed of three symbol packets. That is, with respect to the first symbol packet$_{21}$, the control data or the like is transmitted with the same arrangement as in the first symbol $S_{11}$ shown in FIG. 7, the transmission data is arranged in from a second symbol packet $S_{22}$ on and the CRC as the error detecting code for the data and the tail bit T are arranged in the latter half of a third symbol packet $S_{23}$, or the last packet.

Figure 9:
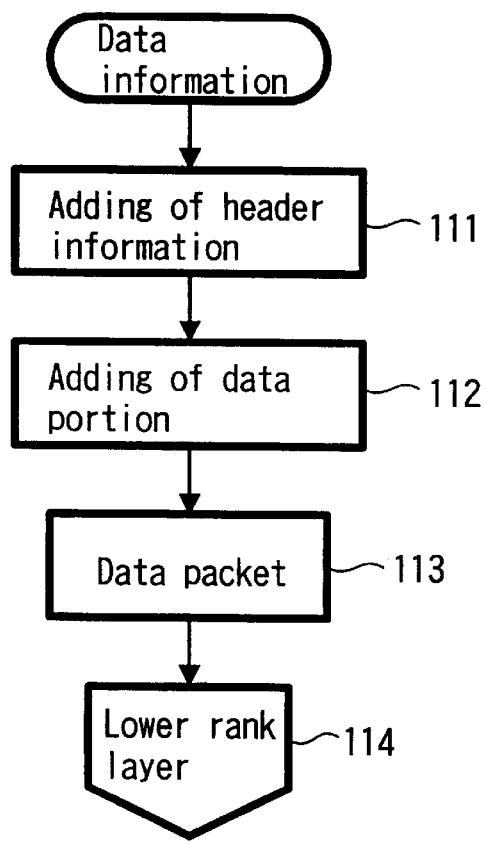
FIG. 9 is a flowchart showing the transmission process in a case of transmitting the header information and data according to an embodiment of the present invention.

Data in a case where the control data and the transmission data are mixed is generated by a process shown in the flowchart of FIG. 9. That is, after the process to add the header information which is the control data and the header CRC is carried out under the control of the control unit 26 (refer to FIG. 2) in the transmission device (step 111), a process to add the transmission data and its CRC is carried out (step 112), these data are packeted to a state shown in FIG. 7 and FIG. 8 or the like (step 113) and supplied to the radio processing unit 22 side, which is the lower rank layer (step 114), for transmission.

Figure 10:
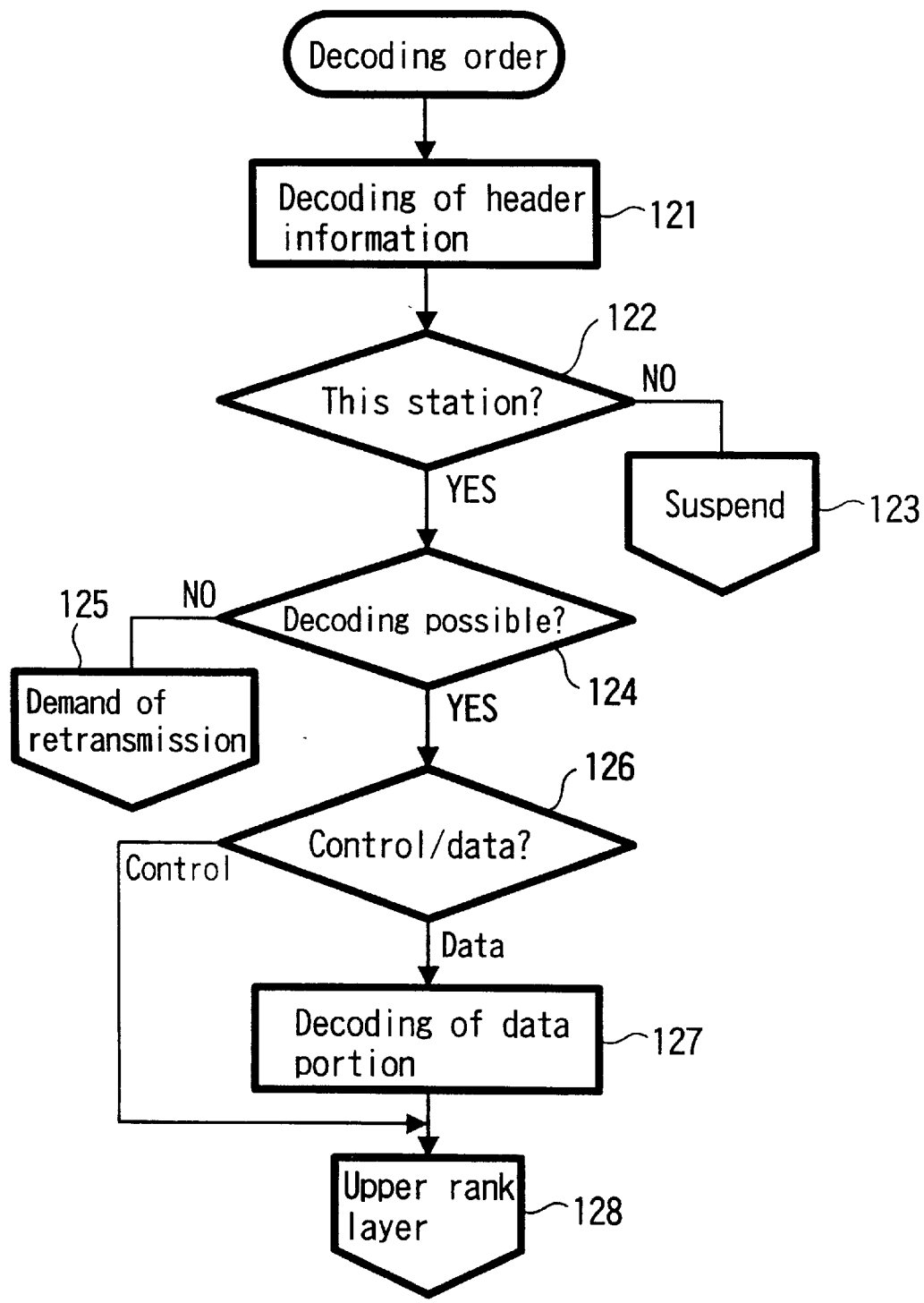
FIG. 10 is a flowchart showing a reception process according to an embodiment of the present invention.

Next, a decoding process at a time of receiving a transmitted signal which is packeted to a state shown in FIG. 5, FIG. 7 and FIG. 8 will be explained with reference to the flowchart in FIG. 10. First of all, the header information of the packet received is decoded under the control of the control unit 26 in the transmission device (step 121). Here, it is judged from the address for a receiver side included in the header information whether or not the transmission is to this station (step 122) and when it is judged that the transmission is addressed to another station other than this station, the decoding process is interrupted and waits until the next packet is received (step 123).

When the control unit 26 judges that the transmission is to this station at step 122, it is judged whether or not it is possible to decode the transmitted signal by an error detecting process (or error correcting process) which uses the header CRC and the like (step 124), and when the decoding is judged impossible, a process of transmitting control data demanding that transmission source station, or the control station transmit again this packet is carried out (step 125).

When the control unit 26 judges it possible to decode the transmitted signal at a step 124, it is judged from information indicated by the control data if the received packet is a packet of only the control data or a packet added with the transmission data (step 126), and when the packet is the one with only the control data, the control data is passed to the upper rank layer (step 128) and when the packet includes the transmission data, decoding of a transmission data portion is carried out (step 127) and the decoded transmitter data is passed to the upper rank layer (step 128).

By transmitting the data having the above-mentioned packet arrangement, each transmission device performs processes of transmitting and receiving the control data and processes of transmitting and receiving the transmission data are carried out by a packet having a common arrangement, and hence the control data and the other data can be subjected to a common process, thereby reducing a load on the transmission device. Particularly, the decoding of the control data as well as the transmission data can be carried out by a common process with a sole decoding circuit, thereby making it possible to simplify an arrangement of the receiving system although separate processes of them are carried out individually in the past.

Also, because the error detecting code is independently added to only the control data in the header portion and further, the number of bits of the error detecting code therefor is made to be comparatively a large value (that is, in the above-mentioned example, the header CRC with 32 bits whereas the control data with 35 bits) compared with that of the original data, a strong error detecting process and a strong error correcting process can be performed, thereby making it possible to prevent erroneous transmission of the control data before it happens. Further, because the error detecting and correcting processes and the decoding process can be carried out by the header portion alone, a judgement whether or not the information is to this station can be made by only a packet in the header portion. For example, when it is data to the other station, ensuing processes of receiving and decoding of the packet can be omitted.

Meanwhile, by carrying out the strong error detecting and correcting processes to the header portion, it becomes possible to surely transmit at least only the control data without unnecessarily improving quality of a transmission path at a stage of designing the transmission path. That is, without making a packet size and the arrangement of the header information portion a special arrangement for the control data or designing a transmission path of unnecessarily high quality, high reliable transmission can be realized with a form which is suited to an existing packet format.

Figure 11:
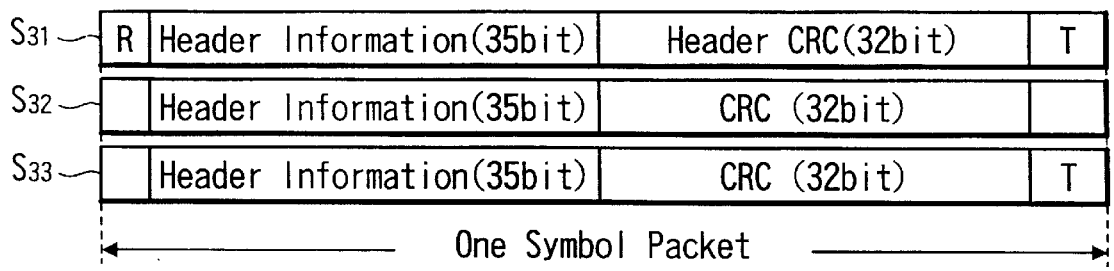
FIG. 11 is an explanatory diagram showing an example of the transmission data arrangement according to another embodiment of the present invention.

Meanwhile, in the above-mentioned embodiment, the control data is made to be transmitted by one symbol packet only at the head, but the control data may well be transmitted by a plurality of symbol packets. In this case, with respect to important control data, the same data may well be transmitted repeatedly a plurality of times. FIG. 11 is a diagram showing an example of a packet arrangement of this case, in which a reference bit R with 4 bits is arranged at the head of a first symbol packet $S_{31}$ to be followed by the header information with 35 bits indicating the control data and following the control data, the header CRC with 32 bits, which is the error detecting code for the control data, is arranged and lastly, the tail bit T with 6 bits is arranged. The arrangement of this first symbol packet $S_{31}$ is the same as that of the packet $S_1$ in the example shown in FIG. 5 of transmitting only one symbol packet, in which only control data in the packet symbol $S_{31}$ concludes the control information. Then, in this example, in both a second symbol packet $S_{32}$ and a third symbol packet $S_{33}$, the same control data is arranged as the header information, and the same header CRC is repeatedly arranged. However, the reference bit R is not added to the second symbol packet $S_{32}$ and the third symbol packet $S_{33}$, and only the tail bit T is arranged in the third symbol packet $S_{33}$ other than in the first symbol packet $S_{31}$.

Figure 12:
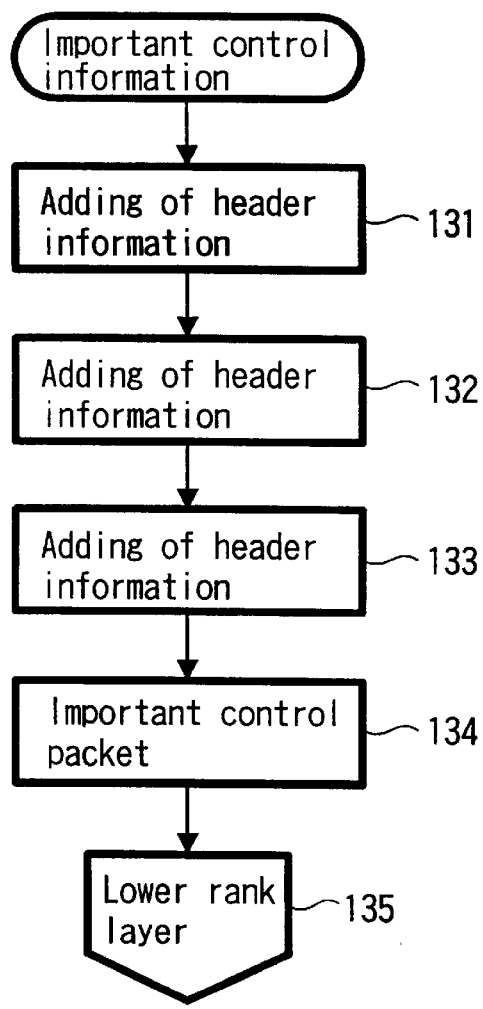
FIG. 12 is a flowchart showing the transmission process according to another embodiment of the present invention.

Data with the packet arrangement shown in FIG. 11 is generated by a process shown in the flowchart of FIG. 12. That is, as a packeting process of the control information, after the process to add the header information and the header CRC to the first symbol packet $S_{31}$ (step 131) is carried out, a process to add the same information to the second symbol packet $S_{32}$ is carried out (step 132) and further, a process to add the same information to the third symbol packet $S_{33}$ is carried out (step 133). Then, these three packets are packeted to states as an important control packet shown in FIG. 11 (step 134), which is supplied to the radio processing unit 22 side, which is the lower rank layer, for transmission (step 135).

Figure 13:
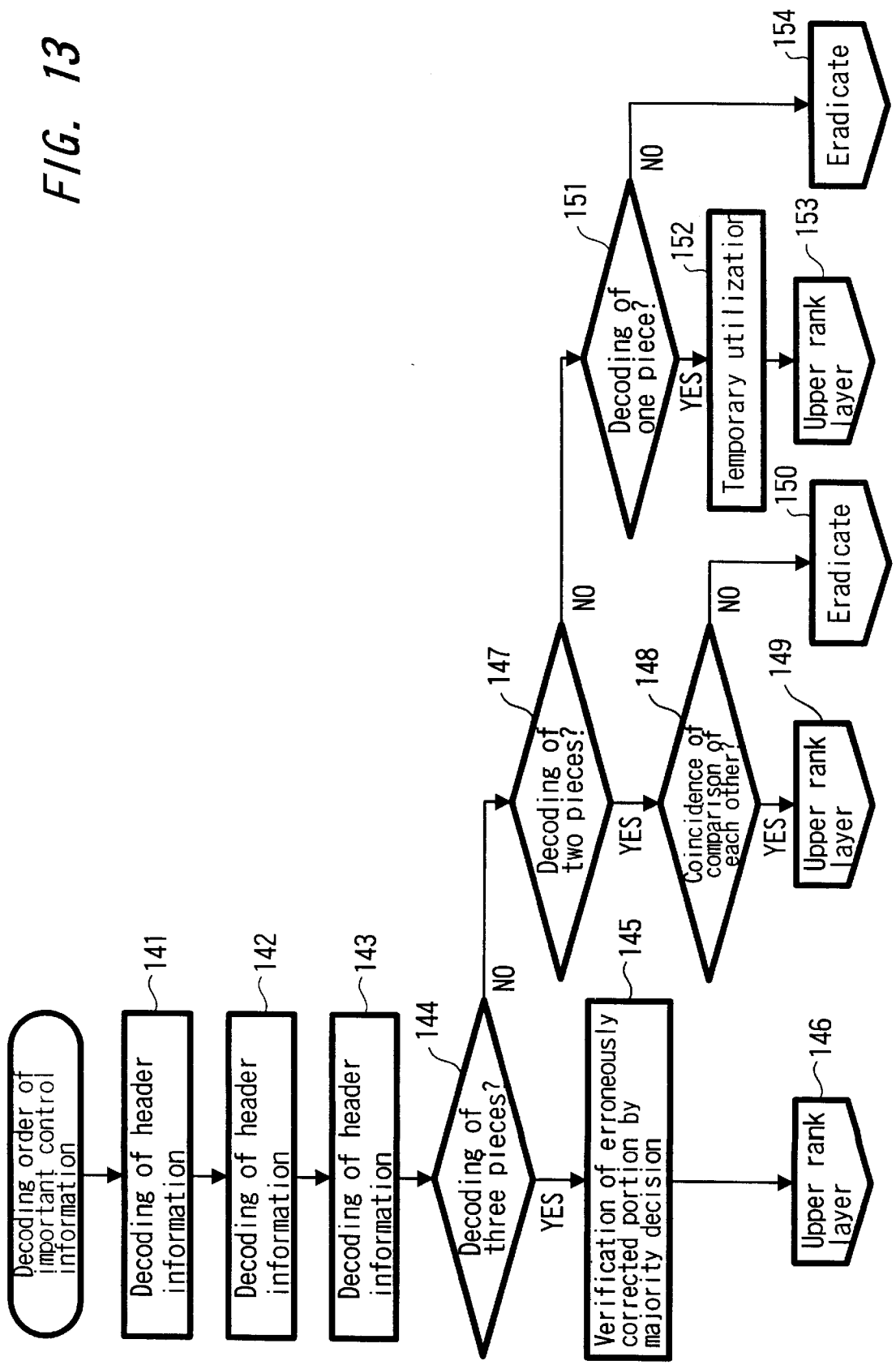
FIG. 13 is a flowchart showing the reception process according to another embodiment of the present invention.

Next, a process on a side for receiving and decoding a signal which repeats the control information three times will be explained with reference to the flowchart in FIG. 13. First of all, the header information in the first symbol packet $S_{31}$ is decoded under the control of the control unit 26 in the transmission device (step 141) to be followed by decoding of the header information in the second symbol packet $S_{32}$ under the control of the control unit 26 in the transmission device (step 142) and further, the header information in the third symbol packet $S_{33}$ is decoded under the control of the control unit 26 in the transmission device (step 143). Then, it is judged whether or not the control data of all the control packet is correctly decoded (step 144) and when all the control data are decoded, verification of an error corrected portion is carried out by a majority judgement of the three control data under the control of the control unit 26 in the transmission device (step 145), thereby supplying the control data which is judged correct to the upper rank layer (step 146).

When it is judged that all the three header information is not decoded at step 144, it is judged whether or not the two header information can be decoded (step 147) and when the two header information can be decoded, the control data which decoded the two header information are compared with each other to judge whether or not they coincide with each other (step 148). Here, when they coincide with each other, the control data are supplied to the upper rank layer (step 149). When there is no coincidence at step 148, the control data are removed and are not used for the control.

When it is judged that decoding of the two header information can not be carried out at step 147, it is judged whether or not one header information can be decoded (step 151), and when the one header information can be decoded, the control data which decoded the one header information is temporarily used (step 152) and supplied to the upper rank layer (step 153). When it is judged that the header information can not entirely be decoded, the received data at this time is removed and is not used for the control (step 154).

By repeatedly transmitting the header information including the control data, a possibility becomes higher of the important control data being surely received and decoded on the receiving side, thereby making it possible to carry out the control process more positively. Meanwhile, here, the example of repeatedly transmitting the same header information three times has been explained, but there may well be an arrangement in which the header information is repeatedly transmitted a plurality of times other than three times.

Figure 14:
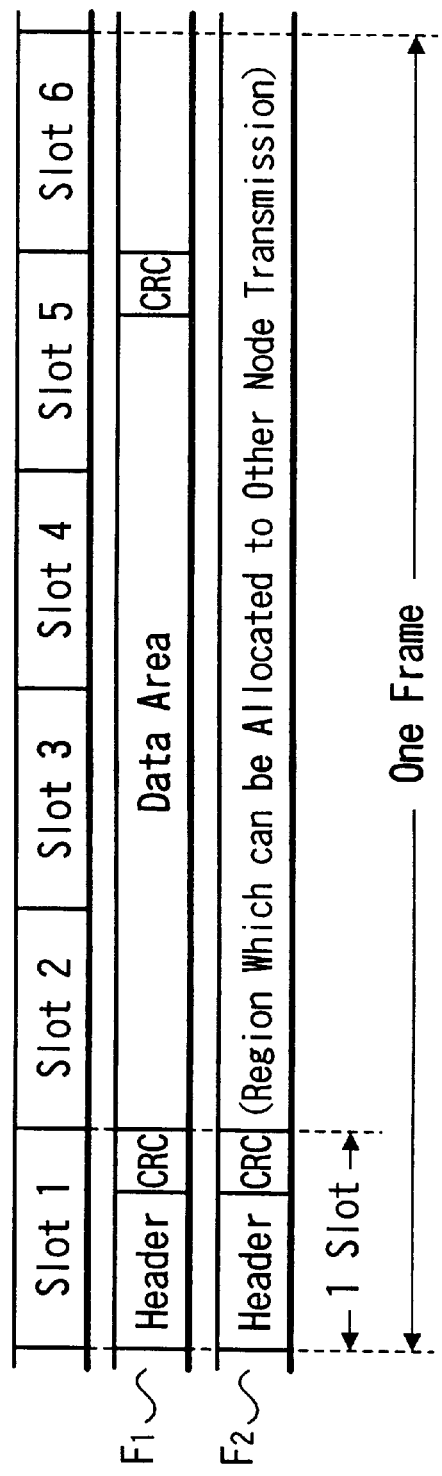
FIG. 14 is an explanatory diagram showing an example of the transmission data arrangement according to a further embodiment of the present invention.

Also, in the above-mentioned embodiment, an example of the packet arrangement in a case of making up the transmission panel with the Orthogonal Frequency Division Multiplex has been shown, but the embodiment can be applied to a packet arrangement in which the other transmission system makes up the transmission path. For example, FIG. 14 is a diagram showing an arrangement of a packet (frame) which is transmitted by a Time Division Multiplex (TDM) system, in which, in a case where one frame corresponding to the one packet in the above-mentioned example is made up of 6 slots, the header information and its CRC are arranged in a first slot of a first frame $F_1$ and the transmission data is arranged in from the second slot on, and the CRC for the transmission data or the like is arranged in the last slot (here, a fifth slot). Then, a next frame $F_2$ is allocated for communicating with the other communication (node) station.

Then, the receiving side decodes the header information in the first slot of each frame, judges the control data as well as if there is the transmission data in from the second slot on and the like. With such an arrangement being in place, the process according to the present invention can be applied to the arrangement in which the transmission path is set by the Time Division Multiplex system.

Also, in a case of a Code Division Multiplex (CDM) system, a portion corresponding to the first packet (frame) is encoded and decoded by using a specified code and at a time when it is judged that the transmission data is included thereafter, by making data of all the packets (frames) decoded, the process of the present invention can be applied.

Also, the above-mentioned embodiment is applied to the radio local area network in a home, but is also applied to the transmission control when the other transmission process is carried out.

Also, in the above-mentioned embodiment, an explanation has not particularly been made about the contents of the control data making up the header information, but there may well be transmitted control data of any form. Also, with respect to the transmission source for transmitting the header information, instead of a case where the transmission device in the transmission source carrying out the data transmission is made to carry out the transmission, a transmission device which is set to be a control station (master) other than the transmission device in the transmission source may well be made to carry out the transmission.

According to the first radio transmission method, the control data and the other data are transmitted with the common packet arrangement, the reception of the control data as well as the other data can be subjected to a common process on the reception side and hence the reception process of the control data can be easily carried out without carrying out a specified process.

According to the second radio transmission method, in the first radio transmission method, by adding the predetermined error detecting code or the error correcting code to the data having the arrangement of the packet transmitted among a plurality of the communication stations as well as by independently adding the predetermined error detecting code or the error correcting code to the transmission data transmitted with the packet arrangement, it becomes possible to favorably transmit only the control data.

According to the third radio transmission method, it becomes possible to more strictly add the error detecting code or the error correcting code to the control data than to the other data, and to excellently transmit only the control data as well as to surely control the transmission within a network system with the control data from the control station.

According to the fourth radio transmission method, the repeated transmission of the control data enhances the possibility of correctly receiving the control data on the reception side.

According to the fifth radio transmission method, in the fourth radio transmission method, by individually adding the error detecting code or the error correcting code to every one unit of the control data transmitted a plurality of times, by individually carrying out the error detecting process or the error correcting process at every one unit of the control data on the reception side and by carrying out the control process by utilizing control data with no error, the favorable reception process becomes possible based on the control data transmitted a plurality of times.

According to the sixth radio transmission method, in a case where the control data and the other data are transmitted with the same packet arrangement or the like, when the received data can not be decoded although each data can appropriately be processed, they are made to be transmitted again, thereby making it possible to appropriately carry out the reception process of the control data.

According to the first radio transmission device, the control data and the other data are transmitted in the form of the common packet arrangement, the reception processes of the control data and the other data can be made common on the reception side, thereby making it possible to simply carry out the reception process of the control data without carrying out a special process.

According to the second radio transmission device, in the first radio transmission device, by carrying out the error detecting process or the error correcting process based on the error detecting code or the error correcting code added to the data having the packet arrangement as well as by carrying out the error detecting process or the error correcting process based on the error detecting code or the error correcting code independently added to the control data included in the header portion, it becomes possible to carry out stringent error detection or error correction processes to the control data as well as to more surely receive the control data than the other data.

According to the third radio transmission device, it becomes possible to more stringently carry out the error detection process or the error correction process to the control data than to the other data, to more surely receive only the control data and to carry out the control process of sure data transmission based on the control data.

According to the fourth radio transmission device, because the same control data is repeatedly transmitted, a possibility becomes higher for this transmitted control data to correctly reach the other radio transmission device as well as a possibility becomes higher that transmission from the other transmission device by the control of this radio transmission device within the network system can be correctly carried out, thereby making it possible to favorably control the transmission control.

According to the fifth radio transmission device, in the fourth radio transmission device, by individually adding the error detecting code or the error correcting code by the control data processing unit to every unit of the control data transmitted from the transmission processing unit a plurality of times, the error detecting process or the error correcting process can be carried out on the reception side at every unit of the control data, and a possibility becomes higher that the control data can be more correctly received.

According to the sixth radio transmission device, in a case where the control data and the other data are transmitted with the same packet arrangement or the like, when the decoding of the reception data can not be carried out although each data is appropriately processed, a countermeasure can be taken by transmitting its data again.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A radio transmission method, comprising the steps of:

transmitting data among a plurality of communication stations with a predetermined packet arrangement;

transmitting control data from one of a communication station of said plurality of communication stations and a control station with said predetermined packet arrangement;

adding one of a predetermined error detecting code and a predetermined error correcting code to said data to be transmitted among said plurality of communication stations with said predetermined packet arrangement; and adding independently one of an error detecting code and an error correcting code to said control data transmitted with said predetermined packet arrangement.

2. A radio transmission method, comprising the steps of:

transmitting data added with one of a first error detecting code and a first error correcting code among a plurality of communication stations; and transmitting control data indicating a transmission control of said data, wherein said control data is independently added with one of a second error detecting code and a second error correcting code.

3. A radio transmission method, comprising the steps of:

transmitting data among a plurality of communications stations with a predetermined packet arrangement; and transmitting control data repeatedly from one of a communication station of said plurality of communication stations and a control station a plurality of times with said predetermined packet arrangement;

adding one of an error detecting code and an error correcting code to each of a plurality of units of said control data transmitted said plurality of times;

performing one of an error detecting process and an error correcting process on a reception side, wherein each of said plurality of units of said control data carries out a control process by utilizing said control data with no error.

4. A radio transmission device, comprising:

a transmission data processing unit for processing data transmitted between said radio transmission device and another said radio transmission device with a predetermined packet arrangement;

a control unit for judging whether control data for an access control is included in a header portion of said predetermined packet arrangement and for performing a corresponding control process; and one of an error detection processing unit and an error correction processing unit for performing one of a first error detecting process and a first error correcting process by utilizing one of a first predetermined error detecting code and a first predetermined error correcting code, respectively, added to said data with said predetermined packet arrangement and at the same time for performing one of a second error detecting process and a second error correcting process by utilizing one of a second predetermined error detecting code and a second predetermined error correcting code independently added to said control data included in said header portion.

5. A radio transmission device for use in performing radio data transmission between said radio transmission device and another said radio transmission device under a control from a predetermined one of said radio transmission devices, comprising:

one of an error detection processing unit and an error correction processing unit for performing one of a first error detecting process and a first error correcting process by utilizing one of a first error detecting code and a first error correcting code, respectively, added to data transmitted between said radio transmission device and said another radio transmission device and at the same time for performing one of a second error detecting process and a second error correcting process by error utilizing a second error detecting code and a second error correcting code, respectively, independently added to control date for performing access control.

* * * * *